(12) United States Patent
Oohashi et al.

(10) Patent No.: US 8,063,523 B2
(45) Date of Patent: Nov. 22, 2011

(54) STATOR FOR ROTARY ELECTRIC MACHINE

(75) Inventors: Masaaki Oohashi, Nagano (JP); Youichi Horiuchi, Nagano (JP); Yasushi Yoda, Nagano (JP); Kouji Nakatake, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 12/716,543

(22) Filed: Mar. 3, 2010

(65) Prior Publication Data
US 2010/0225185 A1 Sep. 9, 2010

(30) Foreign Application Priority Data

Mar. 5, 2009 (JP) ................................. 2009-052386

(51) Int. Cl.
*H02K 11/00* (2006.01)
*H02K 3/46* (2006.01)
(52) U.S. Cl. .......................................... 310/71; 310/260
(58) Field of Classification Search .................... 310/71, 310/260
See application file for complete search history.

(56) References Cited

U.S. PATENT DOCUMENTS

| 5,194,775 | A  | * | 3/1993 | Cooper ......................... 310/260 |
| 5,331,237 | A  | * | 7/1994 | Ichimura ......................... 310/44 |
| 7,205,689 | B2 | * | 4/2007 | Lukenich ......................... 310/71 |
| 7,329,973 | B2 | * | 2/2008 | Oohashi et al. .................. 310/71 |
| 7,535,134 | B2 | * | 5/2009 | Oki et al. ...................... 310/67 R |
| 7,763,999 | B2 | * | 7/2010 | Oohashi et al. .................. 310/71 |
| 2006/0207082 | A1 | * | 9/2006 | Ortt et al. ........................ 29/596 |
| 2007/0040467 | A1 | * | 2/2007 | Gu ................................ 310/216 |

FOREIGN PATENT DOCUMENTS

| JP | 11206057 A | * | 7/1999 |
| JP | 2008-206393 | | 9/2008 |
| WO | WO 2008043534 A1 | * | 4/2008 |

* cited by examiner

*Primary Examiner* — Quyen Leung
*Assistant Examiner* — Thomas Truong
(74) *Attorney, Agent, or Firm* — Rankin, Hill & Clark LLP

(57) ABSTRACT

A pair of connecting wire hooks are disposed on both sides of a nozzle receiving groove in an extended slot space (a first extended space) to sandwich an extended portion of an extended virtual space (a third extended space). In this configuration, the pair of connecting wire hooks are not located within the third extended space. Thus, in the stator for rotary electric machine, the space factor of the winding portion may be increased in a situation where the connecting wire hook is disposed within the first extended space.

1 Claim, 5 Drawing Sheets

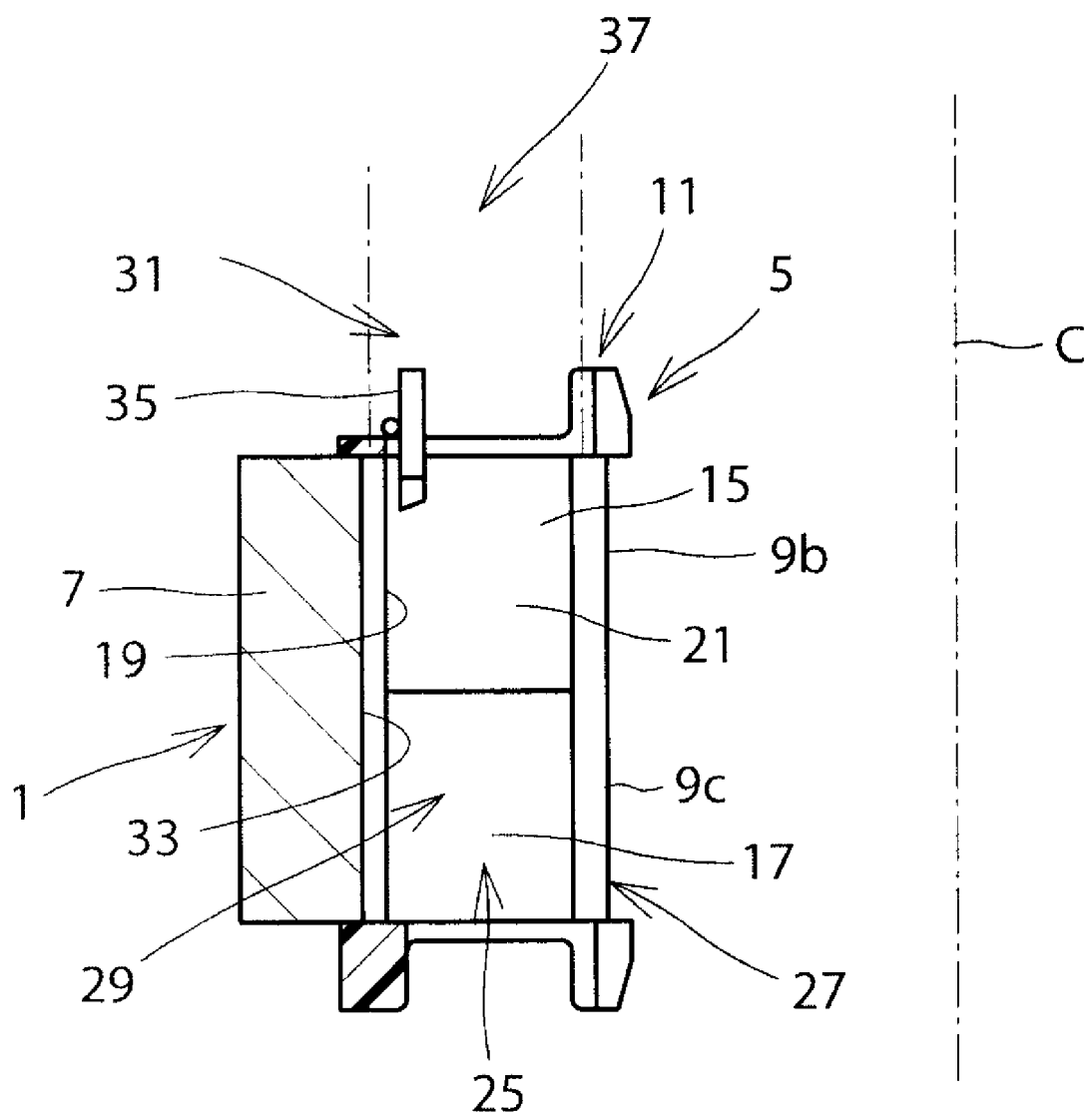

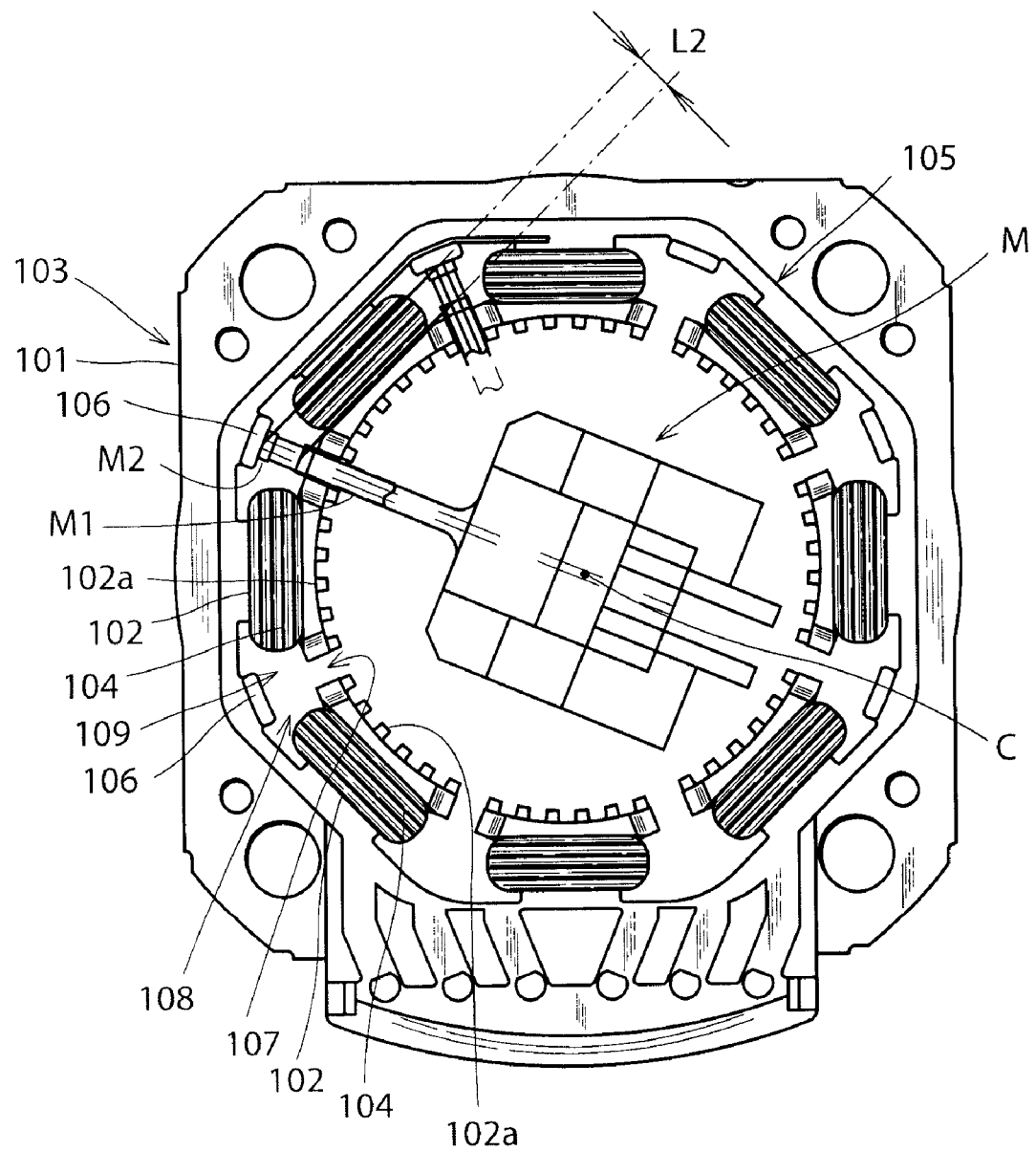

STATOR FOR ROTARY ELECTRIC MACHINE

TECHNICAL FIELD

The present invention relates to a stator for rotary electric machine, and particularly relates to a stator for rotary electric machine in which a connecting wire hook is disposed in a slot insulator.

BACKGROUND ART

Japanese Patent Application Publication No. 2008-206393 (JP2008-206393A) discloses a stator for rotary electric machine that is used for a compact rotary electric machine, which includes a stator core 103 having an annular yoke 101 and a plurality of magnetic pole portions 102 projecting toward a centerline C of the annular yoke 101, a plurality of winding portions 104 formed of a winding conductor wound around the plurality of magnetic pole portions 102, and a slot insulator 105 that is formed of an insulating resin and attached to the stator core 103 for insulating the stator core 103 from the winding portions 104, as shown in FIG. 5. A winding machine M for winding the winding conductor is also illustrated in FIG. 5. A connecting wire hook 106 for engaging with a connecting wire formed of a part of the winding conductor is formed on one end portion of the slot insulator 105. The connecting wire hook 106 is formed in a portion that faces a slot opening space 107, which is a space between adjoining two of magnetic pole pieces 102a covered with the slot insulator 105. The connecting wire hook 106 located within an extended slot space 109, which is defined by extending a slot space 108, where the winding portion 104 is located, toward the connecting wire hook 106 of the slot insulator 105. In other words, the connecting wire hook 106 is formed within the extended slot space 109, which is defined by extending the slot space 108 in a direction perpendicular to the surface of the paper of FIG. 5. It becomes difficult to dispose the connecting wire hook 106 on an end face of the yoke because the diameter of the slot insulator becomes also small as the diameter of the stator core is small in a smaller rotary electric machine. Thus, the connecting wire hook 106 needs to be disposed within the extended slot space 109.

In the stator for rotary electric machine of such type, a winding conductor is led out from a leading end M2 of a nozzle M1 of the winding machine M and wound around the plurality of magnetic pole portions 102. More specifically, the leading end M2 of the nozzle M1 is positioned in the vicinity of the connecting wire hook 106 at first. Subsequently, the nozzle M1 performs what is called a "box movement" which is the combination of an up/down motion in an extending direction of the centerline C and an oscillating motion in the circumferential direction of the annular yoke 101 so that the leading end M2 of the nozzle M1 repeatedly turns around the magnetic pole portion 102. In this manner, the winding conductor is led out from the leading end M2 of the nozzle M1 and wound around the plurality of magnetic pole portions 102.

SUMMARY OF INVENTION

In the above-mentioned stator for rotary electric machine configured such that the connecting wire hook 106 is disposed at the slot insulator 105 within the extended slot space 109, the presence of the connecting wire hook 106 restricts an operative range of the nozzle M1 when a winding conductor led out from the leading end M2 of the nozzle M1 of the winding machine M is wound around the plurality of magnetic pole portions 102. Thus it may be difficult to increase the space factor of the winding portion 104 or in other words, to increase the volume occupied by the winding portion 104 in the slot.

An object of the present invention is to provide a stator for rotary electric machine in which a space factor of a winding portion may be increased even if a connecting wire hook is disposed within an extended slot space (a first extended space).

A stator for rotary electric machine, of which improvements the present invention aims at, comprises a stator core, a plurality of winding portions and a slot insulator formed of an insulating resin. The stator core includes an annular yoke and a plurality of magnetic pole portions that are disposed at an inner peripheral portion of the annular yoke at intervals in a circumferential direction of the annular yoke. The plurality of magnetic pole portions each project toward a centerline of the annular yoke, and have one end integrally formed with the annular yoke. The magnetic pole portions each include a pole column and a magnetic pole piece having a magnetic surface. The pole column has one end integrally formed with the annular yoke and the other end on which the magnetic pole piece is integrally disposed. The plurality of winding portions are formed of winding conductors wound around the plurality of magnetic pole portions of the stator core. The slot insulator formed of an insulating resin is attached to the stator core for electrically insulating the stator core from the winding portions. Usually, the slot insulator is configured from a pair of divided parts so as to sandwich the stator core from both ends thereof.

The slot insulator integrally includes, at one end portion thereof, connecting wire hooks capable of engaging with connecting wires formed of a part of the winding conductor extending from each of the winding portions. Here, the one end portion of the slot insulator is located in one direction where the centerline of the annular yoke extends. Specifically, each of the connecting wire hooks is located at least partially within a first extended space (an extended slot space) which is defined by extending in the one direction a slot space where the winding portion is located.

According to an embodiment of the present invention, the location of the connecting wire hook is determined such that, assuming that a second extended space (an extended virtual space) is defined by extending toward the yoke a slot opening space formed between adjacent two of the magnetic pole pieces covered with the slot insulator, and a third extended space (an extended portion of the extended virtual space) is defined by extending the second extended space in the one direction where the centerline of the annular yoke extends, The connecting wire hook may not be located within the third extended space.

As the connecting wire hook in the first extended space is positioned according to the embodiment of the present invention, the connecting wire hook is not disposed in the third extended space. Thus, the leading end of the nozzle of a winding machine may advance far and reach a portion of the slot insulator facing the slot opening space (namely, a portion conventionally blocked by the connecting wire hook) at the time of starting the winding operation of the winding conductor. As a result, the winding conductor may be wound around the magnetic pole portion at an end portion (base portion) of the pole column thereof close to or near the annular yoke. The nozzle of the winding machine may reach a deepest portion of the slot (a position near the annular yoke) even if the connecting wire hook is disposed within the first extended space. Thus, the space factor of the winding portion may be increased.

Preferably, two of the connecting wire hooks may be disposed in pairs in the first extended space to sandwich the third extended space therebetween. In this configuration, the connecting wire hook may be disposed in the vicinity of a course-changing point of the nozzle of the winding machine, and thus the winding conductor may readily and positively be engaged with the connecting wire hook. Preferably, a nozzle receiving groove, along which the leading end of the nozzle passes, may be formed in a wall portion of the slot insulator that covers the inner peripheral portion of the annular yoke in an area across the second extended space so as to be opened toward the slot space and also toward the one direction and a direction opposite to the one direction. In this configuration, the leading end of the nozzle of the winding machine may advance far and reach the nozzle receiving groove at the time of starting the winding operation of the winding conductor, thereby moving farther into the slot (toward the yoke).

BRIEF DESCRIPTION OF DRAWINGS

FIG. 4 is a cross sectional view of FIG. 3 taken along line IV-IV.

FIG. 5 is a plan view of a conventional stator for rotary electric machine.

DESCRIPTION OF EMBODIMENTS

Figure 1:
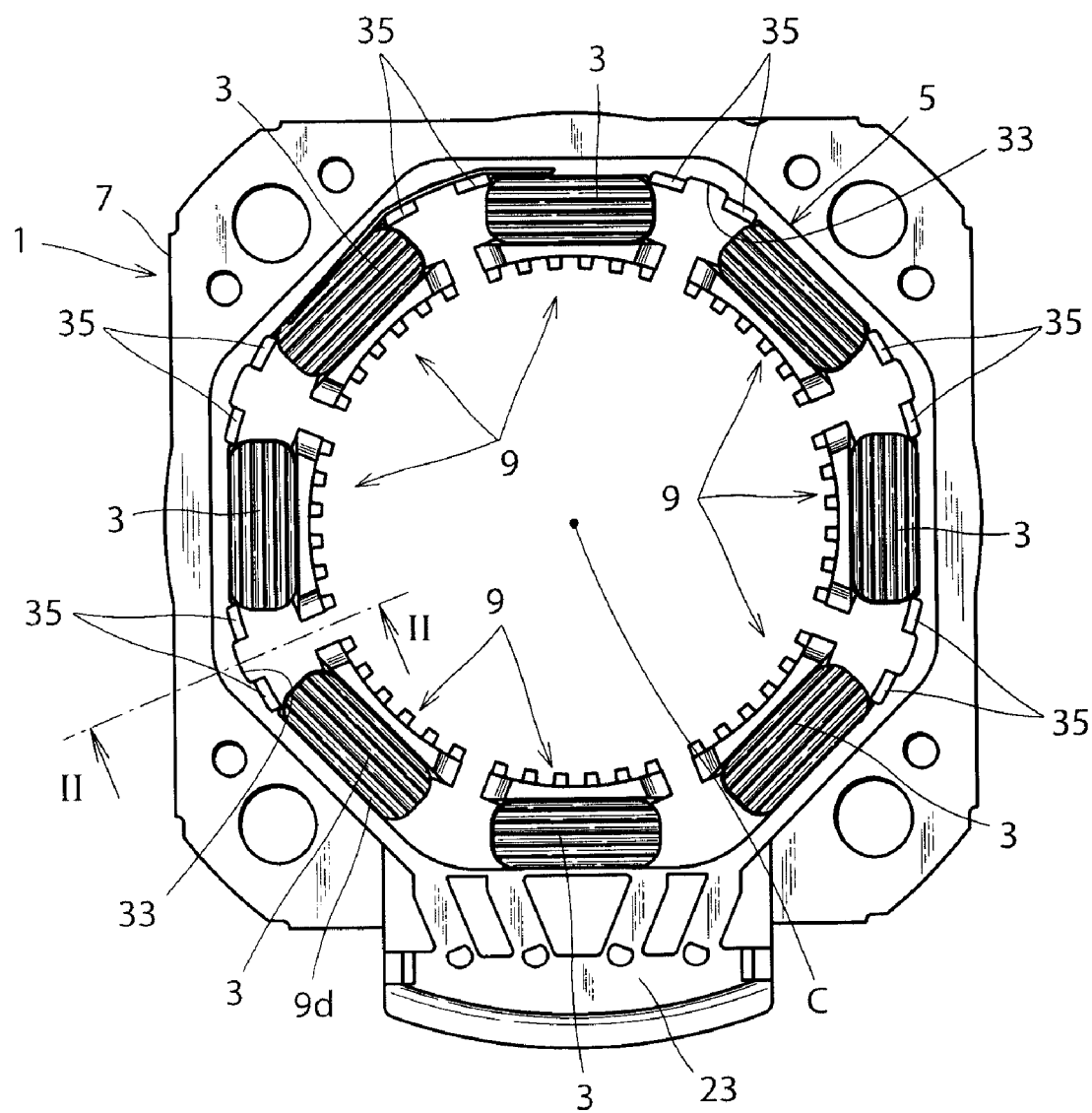
FIG. 1 is a plan view of a stator for rotary electric machine according to an embodiment of the present invention.
Figure 2:
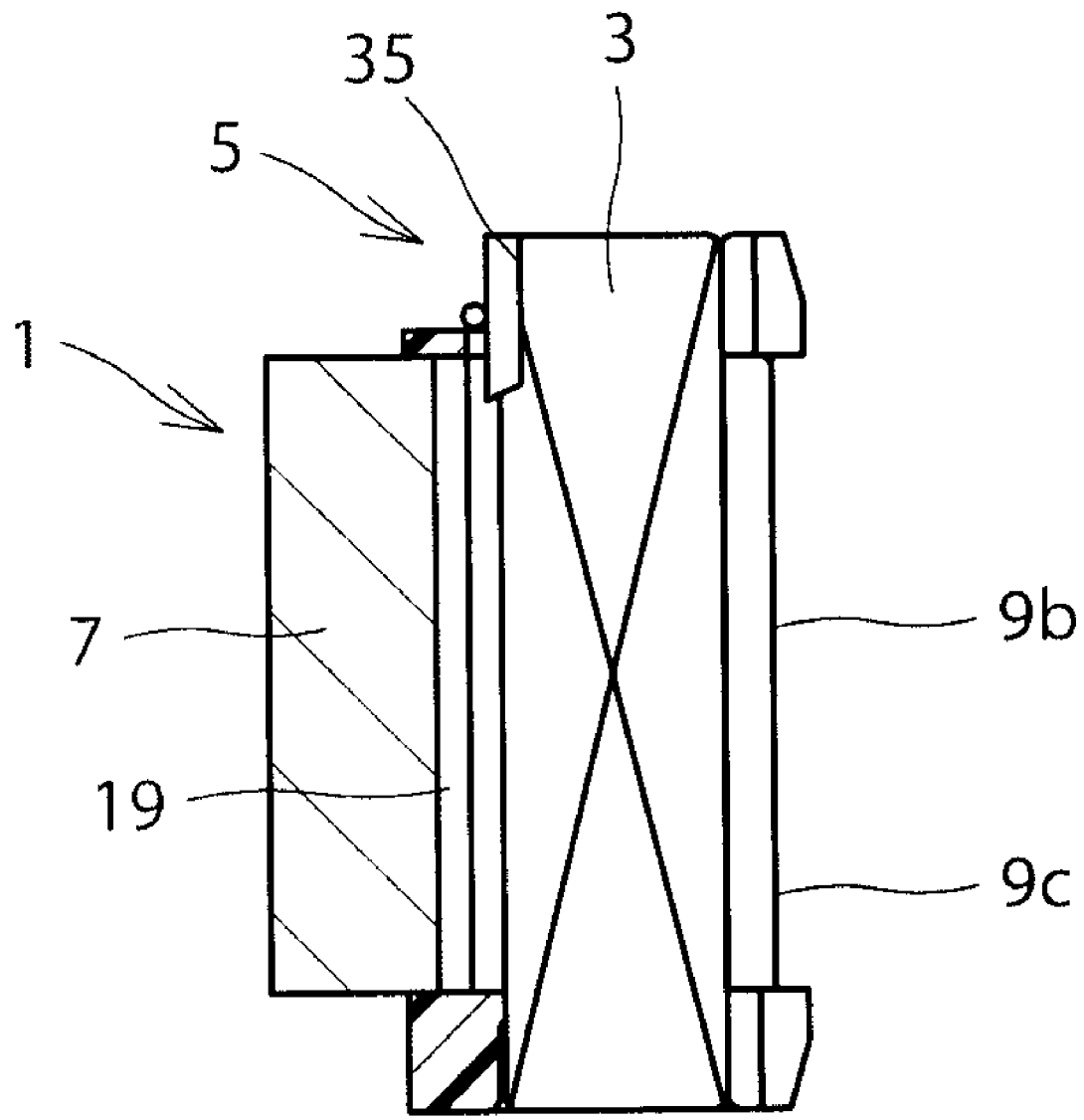
FIG. 2 is a cross sectional view of FIG. 1 taken along line II-II.
Figure 3:
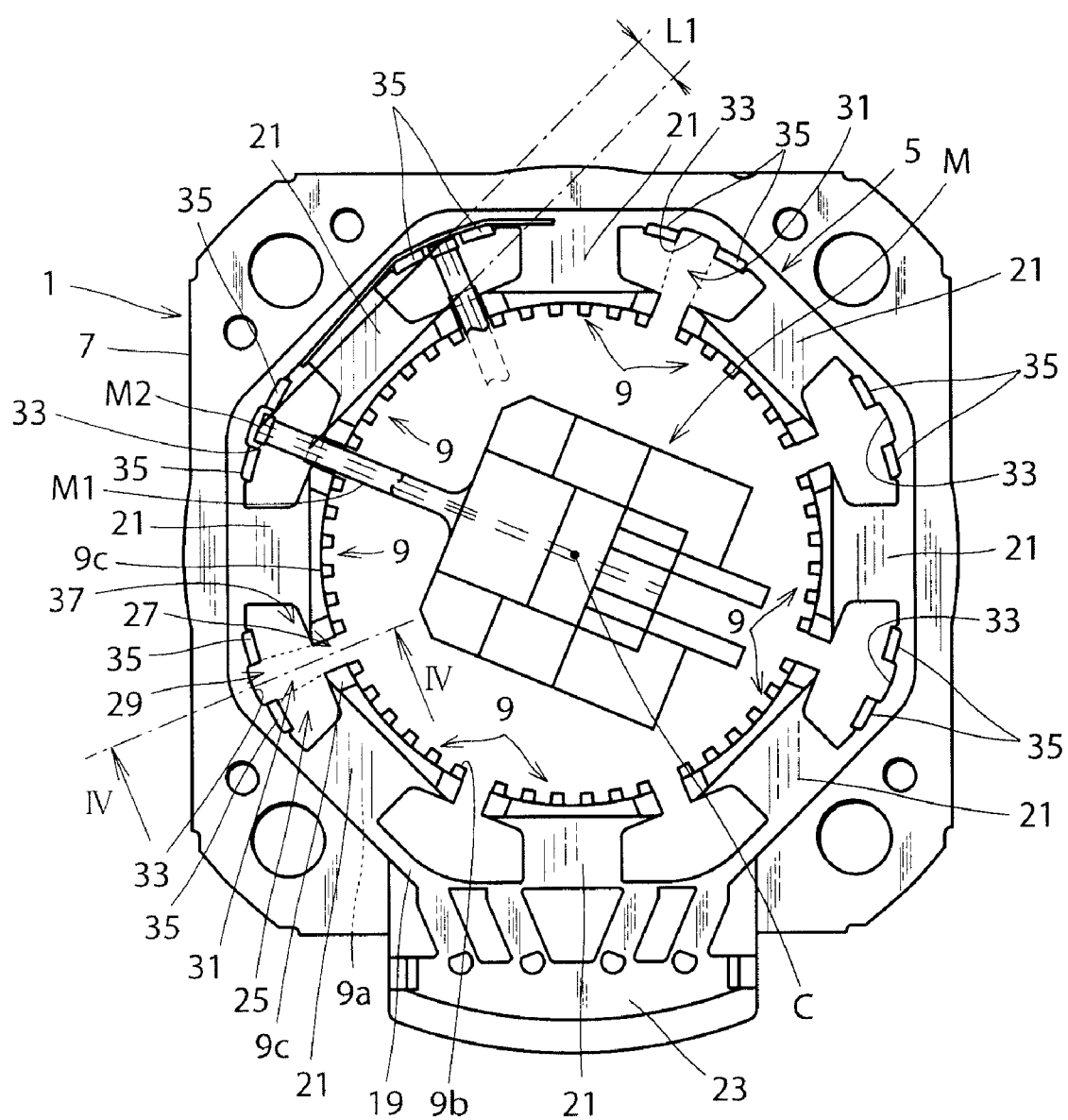
FIG. 3 is a plan view of the stator for rotary electric machine of FIG. 1, illustrating the stator for rotary electric machine in which a winding conductor has not been wound around a magnetic pole portion.

An embodiment of the present invention will now be described hereinbelow in detail with reference to the accompanying drawings. FIG. 1 is a plan view of a stator for rotary electric machine (stator for rotary motor) according to an embodiment of the present invention. FIG. 2 is a cross sectional view of FIG. 1 taken along line II-II. FIG. 3 is a plan view of the stator for rotary electric machine of FIG. 1, illustrating that a winding conductor is wound around a magnetic pole portion. FIG. 4 is a cross sectional view of FIG. 3 taken along line IV-IV. A winding machine M is also illustrated in FIG. 3. As shown in each figure, the stator for rotary electric machine according to the present embodiment includes a stator core 1, eight winding portions 3 of one or more phases (two phases in this embodiment, and a slot insulator 5. The stator core 1 is configured such that an annular yoke 7 includes eight magnetic pole portions 9 disposed at an inner peripheral portion of the annular yoke at intervals in a circumferential direction. The stator core 1 is formed by stacking a plurality of steel sheets of an identical shape in a direction where a centerline C of the annular yoke 7 extends. As shown in FIG. 3, the eight magnetic pole portions 9 each include a pole column 9a projecting toward the centerline C of the annular yoke 7, and a magnetic pole piece 9c having a magnetic surface 9b. The pole column 9a has one end integrally formed with the annular yoke 7 and the other end on which the magnetic pole piece 9c is integrally disposed. The winding portion 3 (FIG. 1) is formed of a winding conductor wound around each of the eight magnetic pole portions 9. A slot insulator 5 formed of an insulating resin is attached to the stator core 1 for electrically insulating the stator core 1 from the winding portion 3.

As shown in FIG. 4, the slot insulator 5 is formed of a pair of insulator divided parts 15 and 17 that are fitted with the stator core 1 from both sides thereof in an extending direction of the centerline C of the yoke 7. The insulator divided body 15 located in the upper side of FIG. 4 is formed of a synthetic resin, and integrally includes a base portion 19 covering the inner peripheral portion of the annular yoke 7, eight bobbin portions 21 each covering a surface of the magnetic pole portion 9 except for the magnetic pole surface 9b, and a holder attachment portion 23 (FIG. 3). Configuration of the insulator divided body 17 of the pair, which is located in the lower side of FIG. 4 is fundamentally the same as that of the insulator divided body 15 except that it includes neither the holder attachment portion 23 nor a connecting wire hook 35 to be described later.

As shown in FIGS. 3 and 4, a slot space 25, where the winding portion 3 is located, is defined, being surrounded by the annular yoke 7 and adjoining two of the magnetic pole portions 9 that are covered with the slot insulator 5. As shown in FIG. 3 where the slot space is designated with a reference numeral of 25 and line IV-IV passes the slot space, a slot opening space 27 is defined between adjoining two of the magnetic pole pieces 9c covered with the slot insulator 5. Further, assuming that a second extended space 29 (an area sandwiched by dotted lines in FIG. 3) is defined by extending the slot opening space 27 toward the annular yoke 7, a third extended space 31 (an area surrounded by dashed dotted lines in FIG. 4) is defined by extending the second extended space 29 in one direction where the centerline of the annular yoke 7 extends (toward the connecting wire hook 35 of the slot insulator 5 illustrated in FIG. 4). A nozzle receiving groove 33 is formed in the base portion 19 of the pair of insulator divided bodies 15 and 17 in an area across the second extended space 29 so as to be opened toward the slot space 25 and also toward the one direction where the centerline C extends and a direction opposite to the one direction.

The insulator divided body 15 integrally includes at one end portion thereof twelve connecting wire hooks 35 extending from the base portion 19 in the one direction where the centerline of the annular yoke 7 extends. Here, the one end portion of the insulator divided body 15 is located in the one direction. A connecting wire formed of a part of the winding conductor extending from the winding portion 3 is engaging with the connecting wire hook 35, which is disposed in pair within the six slot spaces 25 except for two slot spaces 25 in the vicinity of the holder attachment portion 23. In other words, according to the present embodiment, the connecting wire hook 35 is not disposed in the two slot spaces adjoining the holder attachment portion 23. In the present invention, the connecting wire hook need not to be provided for all the slot spaces, and it may be sufficient to dispose the connecting wire hook only in locations where the connecting wire needs to be hooked.

Two of the connecting wire hooks 35 are disposed in pairs in a first extended space 37 which is defined by extending the slot space 25 in the one direction where the centerline C extends. According to the present embodiment, two of the connecting wire hooks 35 in pairs are located to sandwich the third extended space 31 on both sides of the nozzle receiving groove 33. Thus, two of the connecting wire hooks 35 in pairs within the first extended space 37 are not disposed in the third extended space. Namely, the connecting wire hooks 35 are disposed to keep away from a central portion, as viewed in the circumferential direction of the annular yoke 7, of the first extended space 37 (namely, an area corresponding to the third extended space 31).

Hereinbelow, how to wind the winding conductor around the eight magnetic pole portions 9 of the stator for rotary electric machine will be explained according to the present embodiment. First, as shown in FIG. 3, the leading end M2 of the nozzle M1 of a winding machine M is placed in the nozzle receiving groove 33. Subsequently, the nozzle M1 performs what is called a "box movement" which is the combination of an up/down motion in an extending direction of the centerline C and an oscillating motion in the circumferential direction of the annular yoke 7 so that the leading end M2 of the nozzle M1 repeatedly turns around the magnetic pole portion 9. At that time, the winding conductor is led out from the leading end M2 of the nozzle M1 and wound around the pole column 9a covered with the slot insulator 5.

In the stator for rotary electric machine according to the present embodiment, the connecting wire hook 35 is not located in the third extended space 31. Thus the leading end M2 of the nozzle M1 of the winding machine M may advance far and reach a portion of the slot insulator 5 that faces the slot opening space 27 (namely, a portion conventionally blocked by the connecting wire hook) at the time of starting the winding operation of the winding conductor. Thus, a length L1, shown in FIG. 3, by which the leading end M2 of the nozzle M1 reciprocates within the slot space 25 is longer than a length L2, shown in FIG. 5, by which the leading end M2 of the nozzle M1 reciprocates within a slot space 108. As a result, in the stator for rotary electric machine according to the present embodiment, the winding conductor may be wound around an end portion 9d of the magnetic pole portion 9, located on a side of the yoke (see the lower left portion of FIG. 1), thereby forming the winding portion 3. In the conventional stator for rotary electric machine as shown in FIG. 5, the winding conductor is not wound around an end portion 102 of the winding portion 104, located on the side of the yoke. As a result, the space factor of the winding portion is more increased than ever in a situation where the connecting wire hook 35 is positioned within the first extended space 37.

Two connecting wire hooks 35 are disposed in one slot space 25 in the above-mentioned embodiment. A single connecting wire hook 35 may be disposed in one slot space according to the present invention. Although the connecting wire hook 35 may preferably be located in the vicinity of the nozzle receiving groove 33, it may be located in the vicinity of the base portion of the pole column 9a of the magnetic pole portion 9 as long as the space factor can be increased more than ever.

According to the present invention, the connecting wire hook is not located in the third extended space, which is defined by extending in the one direction the second extended space which is defined by extending toward the yoke the slot opening space that is formed between adjoining two of the magnetic pole pieces covered with the slot insulator. Thus, the leading end of the nozzle of the winding machine may advance far and reach a portion of the slot insulator that faces the slot opening space (an area which is blocked by the connecting wire hook in conventional arts). As a result, a winding conductor may be wound around the magnetic pole portion from a base portion of the pole column, and the space factor of the winding portion may be increased in a situation where the connecting wire hook is located in the first extended space.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A stator for rotary electric machine, comprising:
a stator core including an annular yoke and a plurality of magnetic pole portions disposed at an inner peripheral portion of the annular yoke at intervals in a circumferential direction of the annular yoke and projecting toward a centerline of the annular yoke, the magnetic pole portions each including a pole column and a magnetic pole piece having a magnetic surface, the pole column having one end integrally formed with the annular yoke and the other end on which the magnetic pole piece is integrally disposed;
a plurality of winding portions formed of winding conductors wound around the plurality of magnetic pole portions of the stator core;
a slot insulator formed of an insulating resin, attached to the stator core for electrically insulating the stator core from the winding portions, and including at one end portion thereof connecting wire hooks capable of engaging with connecting wires formed of a part of the winding conductor extending from each of the winding portions, wherein the one end portion of the slot insulator is located in one direction where the centerline of the annular yoke extends, and each of the connecting wire hooks is integrally formed with the one end portion of the slot insulator such that the connecting wire hook may be located at least partially within a first extended space that is defined by extending in the one direction a slot space where the winding portion is located, and such that, assuming that a second extended space is defined by extending toward the yoke a slot opening space formed between adjacent two of the magnetic pole pieces covered with the slot insulator and a third extended space is defined by extending the second extended space in the one direction, the connecting wire hook may not be located within the third extended space;
wherein two of the connecting wire hooks are disposed in pairs in the first extended space to sandwich the third extended space therebetween;
wherein each of the winding portions is formed of the winding conductor which is led out from a leading end of a nozzle and wound around the pole column covered with the slot insulator;
wherein a nozzle receiving groove, along which the leading end of the nozzle passes, is formed in a wall portion of the slot insulator that covers the inner peripheral portion of the annular yoke in an area across the second extended space so as to be opened toward the slot space and also toward the one direction and a direction opposite to the one direction;
wherein the two of the connecting wire hooks are located to sandwich the third extended space on both sides of the nozzle receiving groove such that the leading end of the nozzle passes between the two of the connecting wire hooks; and
wherein a bottom of each nozzle receiving groove is located more radially outward than bases of the connecting wire hooks.

* * * * *